Sept. 16, 1952     I. R. CHANDLER     2,611,070

CONTROL FOR ELECTRICAL COOKING APPLIANCES

Filed Oct. 19, 1949

Inventor:
Irving R. Chandler,
by *Sheridan* *Regis*
His Attorney.

Patented Sept. 16, 1952

2,611,070

UNITED STATES PATENT OFFICE 2,611,070

CONTROL FOR ELECTRICAL COOKING APPLIANCES

Irving R. Chandler, Brooklyn, N. Y., assignor to General Electric Company, a corporation of New York Application October 19, 1949, Serial No. 122,188

1 Claim. (Cl. 219—44)

My invention relates to an electrical cooking appliance and a control therefor. More particularly, it relates to a control for regulating automatically, and within practical limits, the internal pressure and temperature of an electrically heated pressure cooker. In a broader sense, my invention is concerned with the control of heating elements used for cooking.

Controls have heretofore been proposed for the general purpose of automatically regulating temperature in cookers, but to my knowledge such controls have been quite complicated and therefore difficult to manufacture, adjust and service. One object of my invention is to produce a control of the character desired which is simple in form and arrangement and relatively easy to manufacture, adjust and service.

A further object of my invention is to provide a control for cookers which will operate in a practical fashion within the limits ordinarily required for the type of cooking operation involved.

Another object is to provide a control which will bring the cooker rapidly up to a desired cooking point. This saves time in the complete cooking operation. Once the desired point is reached, the control of my invention will function to use the minimum of electrical energy to maintain the cooker at that point. This minimizes "overshoot" and conserves electrical energy without prolonging the cooking period.

These objects and others are obtained according to my invention by providing two thermally actuated circuit controlling devices of different operational characteristics and in different thermal relationships with respect to the heating element of the cooker. These thermostatic devices are located in such a manner that their operation depends upon the temperature of the contents of the cooker and the length of time heat has been generated by the electrical heater. Use is made of the natural lag between the time when a part of the cooker near the heater reaches a given temperature, and the time when another part of the cooker approaches that temperature.

Other objects and the details of that which I believe to be novel and my invention will be clear from the following description and claim taken with the accompanying drawing in which is illustrated an exemplary pressure cooker with a control embodying the present invention and incorporating the thermostatic devices mentioned above.

Figure 1:
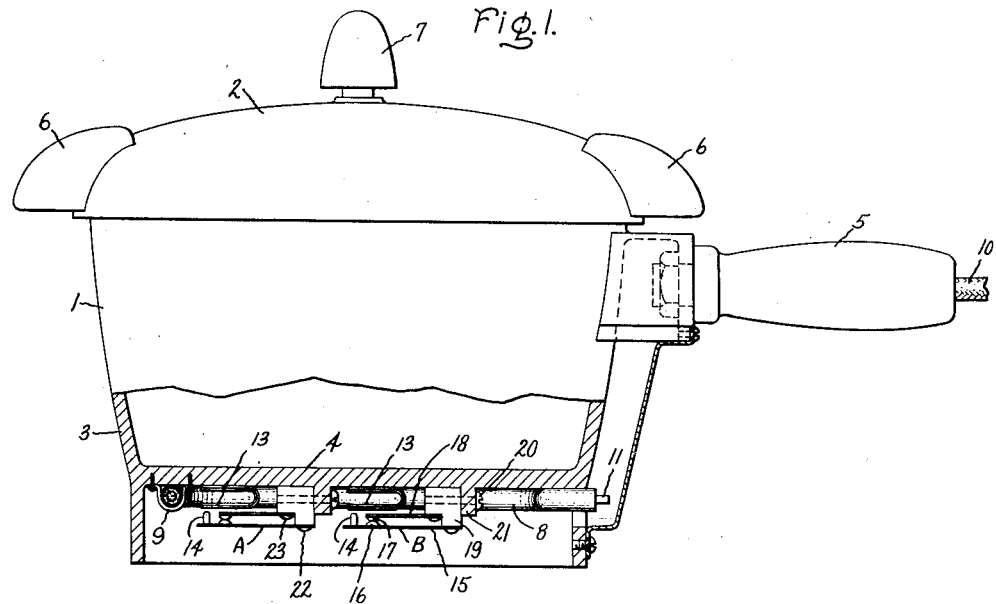
Figure 2:
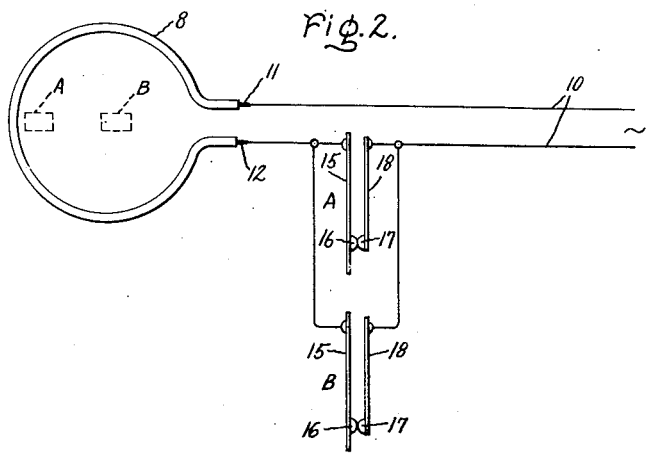

In the drawing, Fig. 1 is a side view partly in section of a pressure cooker embodying my invention, and Fig. 2 is a wiring diagram for the cooker of Fig. 1, with a schematic plan view showing the heating element and the relative location of the thermostats.

As is usual in pressure cookers and similar electrical cooking appliances, a cooker according to my invention will have a vessel 1 and a cover 2 of suitable form, usually made of cast iron or aluminum. The vessel has the usual side walls 3 and a bottom wall 4 which contains the food to be cooked, and a handle 5 may be provided for the vessel. Suitable pressure sealing and locking means (not shown) are provided between the vessel and the cover and customary handles 6 for the cover are also provided. A pressure relief or bleeder valve 7 may also be provided in the cover to exhaust steam if the pressure inside of the cooker exceeds a given limit, say 17 pounds. Details of the seal between the vessel and the cover and details of the pressure relief valve are not shown in this application because such structures are well known and by themselves form no part of the present invention.

The control system of my invention is intimately associated with the heating element for the cooker and I have shown this heating element as being attached under the bottom of the cooking vessel, although it is obvious that it might be located elsewhere. In the example shown in the drawings the heater comprises a sheathed, coiled wire resistance element 8 of a well known type secured by a series of straps 9 or other supports to the bottom of the vessel. For purposes of illustration the heating element is shown as substantially circular in plan view, although it is obvious that other shapes could be used. Power to the heating element is obtained from a suitable source and may be brought to the cooker through the cord 10, shown in Fig. 1 as extending through the handle of the cooker. One side of this cord is directly connected to a terminal 11 of the heating element and the other side of the wire is connected to the other terminal 12 of the heating element through the control devices which are described below.

In the control side of the power circuit I arrange in parallel two thermally actuated circuit interrupting devices. These are designated generally as A and B and they are similar in structure although their calibrations and their thermal relationships with the heating element are different. Therefore a detailed description of only one of these cutouts will be given. Power is supplied to the heating element when either one of these thermostatic controls is closed.

Power to the heating element therefore will not be interrupted unless both thermal contacts are opened at the same time.

The thermal controls may be of any desired type but for simplicity I have shown each of them as comprising a bimetallic strip 13 welded or otherwise secured in good thermal conducting relation to the bottom wall of the vessel. When heated, the free end of the bimetallic strip will flex away from the bottom of the vessel until it hits an insulating post 14 which is carried by a flexible resilient contact arm 15, in turn carrying a movable contact 16. Thus, when the thermostat flexes it will move the arm 15 and contact 16 away from the bottom of the vessel.

Cooperating with the contact 16 is a relatively stationary contact 17 supported by an arm 18. Both the flexible arm 15 and the stationary arm 18 are supported by but insulated from the bottom of the vessel and insulated from each other by the stepped block 19, which is in turn secured by a rivet or bolt 20 passing through a supporting lug 21 on the bottom of the vessel. Suitable terminal screws 22 and 23 allow connection of the control circuit wires to the contact-carrying arms so that the circuit of Fig. 2 is obtained. When contact 16 is moved by the thermostat away from the bottom of the vessel, the circuit through contacts 16 and 17 is broken. At normal room temperatures these contacts will be closed because the arm 15 is resiliently biased toward the arm 18.

Thermostat A is so located with respect to the heater that its response to changes in temperature of the heater will be comparatively rapid. I have therefore shown it as close to the heater.

Thermostat B is so located that its response will follow more closely the temperature of the contents of the cooker. For this reason I have shown it as spaced away from the heater, near the center of the ring formed by the heating element. Because of this difference in spacing the response of thermostat B to changes in temperature of the heating element will be less rapid than the response of thermostat A. The temperature of the thermostat A will therefore approach and be responsive to that of the heating element itself, while the temperature of the thermostat B will closely approach and be responsive to the temperature of the contents of the cooker. The temperature of the central portion of the bottom of the cooker will be approximately the same as that of the contents of the cooker.

The two thermostats are calibrated so that their contacts will open at different degrees of heat. In the example shown, thermostat A will open its contacts at a temperature of from 2 to 5 degrees Fahrenheit above the temperature of saturated steam at 15 pounds gauge, which will be the desired cooking temperature. Thermostat B is designed or calibrated so that its cutoff temperature is on the order of from 8 to 10 degrees below the temperature of saturated steam at 15 pounds gauge.

This arrangement results in the following operation: Assuming that the cooking vessel, its contents, and the heater are at room temperature, when voltage is applied to the device the heating unit will start to transmit heat. The contacts of both thermostats A and B are closed. Within a short time the temperature near thermostat A has risen to such an extent that the bimetal 13 is flexed, pressing against the insulating rod 14 and moving the arm 15 and contact 16, interrupting the circuit through the contact 17 on the arm 18. As explained above, this alone will not completely interrupt the circuit through the heater because thermostat B will remain closed. There will be a time lag before thermostat B approaches the cooking temperature. Heat generation will therefore continue. At a later interval the thermostat B will reach its cutoff temperature and power will be entirely cut off to the heating element.

It is true that when the thermostat B does operate, cutting the power off, the pressure within the vessel is still below the 15 pounds gauge desired, but enough heat energy has been generated in the heating element and stored in the adjacent wall of the vessel so that the pressure will keep rising. During this time the temperature near thermostat A is of the order of 350 to 499 degrees Fahrenheit.

As the temperature of thermostat A falls to its cutoff point of approximately 255 degrees Fahrenheit, the contacts will close and heat will again be applied by the heating elements. The contacts of thermostat B will still be open because this thermostat is still above its cutoff temperature. Because of its setting and its proximity to the heating element thermostat A will quickly reach its cutoff temperature and will again open, causing interruption of the circuit through the heater.

When the heater is off, thermostat A will again cool down and the process of closing and opening the contacts of thermostat A will continue periodically, adding an almost constant quantity of heat per unit of time or per cycle of operation, to make up for the heat losses near the equilibrium point.

If the pressure within the cooker drops too low because of too frequent operation of the thermostat A or the addition to the cooker of cold food, the thermostat B will close its contacts and add a greater quantity of heat in order to bring the pressure up. With a correct setting of thermostats I have found that pressure variation within the vessel for different loads can be held as close as 4 pounds per square inch.

The bleeder valve 7, if set for a limit of 17 pounds, will tend to cut the peaks on the time-pressure curve for the vessel and give more accurate control.

By proper setting of the thermostats with respect to the desired temperatures of the cooker and of the heating element, there should be little variation in the control, whatever the operating load. In effect, this arrangement establishes the "overshoot" in temperature of the heating element in the first operating cycle. In this way, the time needed to reach proper pressure within the cooker is reduced.

Of course, other thermally responsive devices may be used in place of the bimetallic strips. These are preferred because of their simplicity and low cost, as well as the fact that they may be compactly constructed so as to be responsive to the temperature within a limited area.

As will be evident from the foregoing description, certain aspects of my invention are not limited to the particular details of construction of the example illustrated, and I contemplate that various and other modifications and applications of the invention will occur to those skilled in the art. It is therefore my intention that the appended claim shall cover such modifications as do not depart from the true spirit and scope of my invention.

What I claim as new and desire to secure by Letters Patent of the United States is:

An automatic electric cooker comprising a vessel having a side wall and a bottom wall, an electric heating element mounted on and extending in a loop around the peripheral portion of said bottom wall, a normal cycling thermostatic switch positioned on the outer surface of said bottom wall at its outer edge where it is in physical proximity to a portion of the heating element to be sensitive to the heating element temperature, said thermostatic switch having a narrow temperature differential of operation from a circuit closed position when its temperature is slightly below a given cooking temperature to a circuit open position when above said cooking temperature, a second cycling thermostatic switch positioned on the outer surface of the bottom wall of the cooker at its center so as to be predominantly influenced by the temperature of the cooker and its contents, said second thermostatic switch also having a narrow temperature differential of operation from closed position to open position and in a range entirely below said given cooking temperature, and circuit means connecting said thermostatic switches in parallel circuit relation with each other and in series circuit relation with said heating element.

IRVING R. CHANDLER.

REFERENCES CITED

The following references are of record in the file of this patent:

UNITED STATES PATENTS

| Number | Name | Date |
|---|---|---|
| 1,678,885 | Thomas | July 31, 1928 |
| 2,046,718 | Bletz | July 7, 1936 |
| 2,189,127 | Brannon | Feb. 6, 1940 |
| 2,244,580 | Smith | June 1, 1941 |
| 2,312,555 | Jepson | Mar. 2, 1943 |
| 2,480,337 | Pearce | Aug. 30, 1949 |
| 2,504,728 | Purpura | Apr. 18, 1950 |
| 2,515,879 | Korn | July 18, 1950 |